United States Patent [19]

Wood

[11] Patent Number: 4,842,411
[45] Date of Patent: Jun. 27, 1989

[54] METHOD OF AUTOMATICALLY MEASURING THE SHAPE OF A CONTINUOUS SURFACE

[75] Inventor: George A. Wood, Nashua, N.H.

[73] Assignee: Vectron, Inc., Columbus, Ind.

[21] Appl. No.: 826,829

[22] Filed: Feb. 6, 1986

[51] Int. Cl.$^4$ .............................................. G01B 11/24
[52] U.S. Cl. .......................................... 356/376; 356/2
[58] Field of Search ................................ 356/1, 2, 376

[56] References Cited

U.S. PATENT DOCUMENTS

| | | | |
|---|---|---|---|
| 3,432,674 | 3/1969 | Hobrough | 356/2 |
| 3,901,595 | 8/1975 | Helara et al. | 356/2 |
| 4,343,553 | 8/1982 | Nakagawa et al. | 356/376 |
| 4,443,705 | 4/1984 | DiMatteo et al. | 356/2 |
| 4,525,858 | 6/1985 | Cline et al. | 356/2 |
| 4,534,650 | 8/1985 | Clerget et al. | 356/1 |
| 4,657,394 | 4/1987 | Halioua | 356/376 |

FOREIGN PATENT DOCUMENTS 0147612   8/1985   Japan ........................ 356/1

Primary Examiner—F. L. Evans
Attorney, Agent, or Firm—Joseph S. Iandiorio; Douglas E. Denninger

[57] ABSTRACT

Three-dimensional measurement of a surface of an object under inspection is performed by projecting a light pattern upon the surface, having a periodic, smoothly varying light intensity in the X direction and having a non-changeable intensity in the Y direction in the manner of a grid, and thereafter electronically producing a pair of stereo images of the surface so illuminated by a pair of CCD arrays; measuring the parallax phase offsets between correlated corresponding homologous points in the stereo images, and converting the resulting parallax data to an array of Z-depth data, indicative of the shape of the surface of the object. A single left and right stereo snapshot is simultaneously obtained, so that relative motion between the object and the field of view has no adverse effect on accurate measurement, and the solid state light detection arrays are fully offset in an outboard direction with respect to the principal optical viewing axes, so that a stereo-based distance is provided which may be maximized to obtain more accurate measurements.

16 Claims, 1 Drawing Sheet

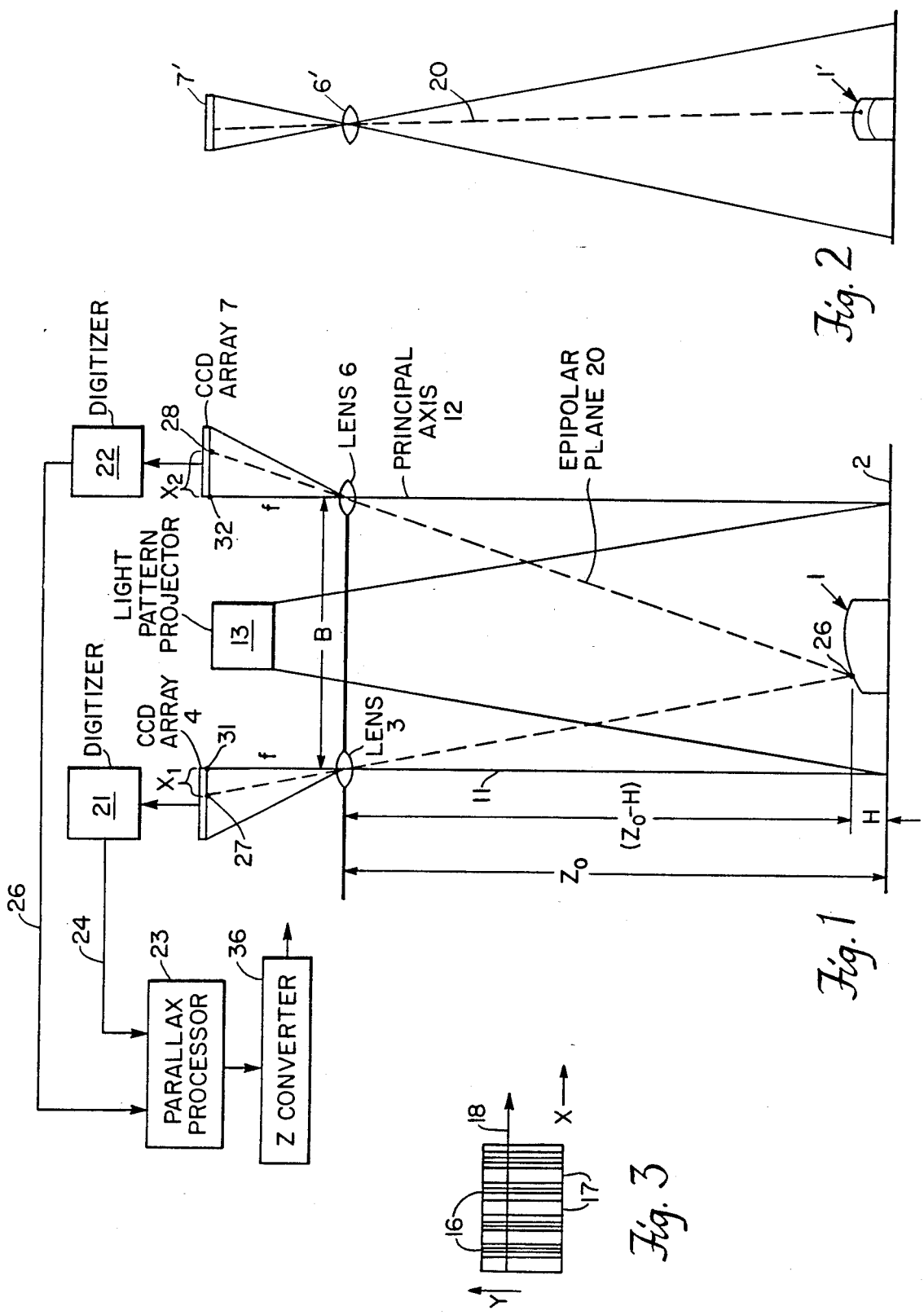

METHOD OF AUTOMATICALLY MEASURING THE SHAPE OF A CONTINUOUS SURFACE

BACKGROUND OF THE INVENTION

The present invention relates to the field of automated inspection systems for measuring the shape and configuration of manufactured parts.

The reconstruction of 3-dimensional surfaces has been attempted by employing interferometers for quantifying the surface characteristics of various objects. Other complex techniques employ moire contouring; see U.S. Pat. No. 3,943,278 to Ramsey. A summary of these techniques may be found in columns 1 and 2 of U.S. Pat. No. 4,525,858 to Kline et al.

Single solid state cameras employed in 3-dimensional object measurement tasks have also been deployed to record the surface reflections resulting from structured light sources, e.g. a plane fan of laser light, thereby to reconstruct height profiles over the surface; this approach requires relative motion between the part being measured and the measurement apparatus. Techniques employing laser triangulation and ultrasonic ranging, are also known, and are slow.

U.S. Pat. No. 4,070,683 to Altchuler et al. illustrates a technique employing a single camera for viewing an object having an optical grid pattern directed thereon. Distortions in the grid pattern are measured to determine the shape of the surface of the object. In U.S. Pat. No. 3,894,802, line patterns are also employed, which function in the manner of a range finder, whereby the changes in the shape of the object are indicated by various degrees of separation between the lines projected upon the object. A significant problem with the latter two patents is that the use of optically projected lines for determining shape would interfere with a simultaneous process of automatic edge detection, where not only the shape of a continuous surface of the part is to be measured, but the placement of edges are also to be automatically determined. Confusion between the lines utilized to measure the shape of the object with lines representing actual edges of a machined part, for example, renders the automatic processing of data derived from scanning the object quite difficult.

SUMMARY OF A PREFERRED EMBODIMENT OF THE INVENTION

It is therefore an important goal of the present invention to provide a method of accurately measuring the shape of a continuous surface of an object in a manner which does not interfere with determining, at the same time, exact placement and configuration of the edges of the object. It is also an object of the invention to perform the foregoing function in a manner which insures that relative motion between the object and the field of view does not distort the measurement obtained. Such motion may be due to vibration or actual movement of the inspected parts under the inspection apparatus, such parts being carried by, for example, a conveyor belt.

In accordance with a preferred method of the invention, a 3-dimensional measurement of a surface of an object under inspection is performed by projecting a light pattern upon the surface, having a periodic, smoothly varying light intensity in the X direction and having a non-changeable intensity in the Y direction in the manner of a grating, and thereafter electronically producing a pair of stereo images of the surface so illuminated; measuring the parallax phase offsets between correlated corresponding homologous points in the stereo pixel arrays, and converting the resulting parallax data to an array of Z-depth data, quantifying the shape of the surface of the object. A single left and right stereo snapshot is obtained simultaneously, so that relative motion between the object and the field of view has no adverse effect on accurate measurement. Preferably, the solid state light detection arrays are fully offset in an outbound direction with respect to the principal optical viewing axes, to enable the projection of the full object image upon each light detection array.

Other objects, features and advantages of the present invention will become apparent upon study of the following specific description.

BRIEF DESCRIPTION OF THE DRAWINGS

FIG. 1 schematically illustrates the overall operation of a preferred embodiment of the invention;

FIG. 2 illustrates a partial side view of the image collection apparatus of FIG. 1; and FIG. 3 illustrates a schematic illustration of one type of illumination pattern.

SPECIFIC DESCRIPTION

Stereo photogrammetry historically employed cameras for creating left and right stereo images upon photographic film which is too slow and cumbersome to be used for automated industrial inspection systems. Electronic video correlation of corresponding points in a pair of stereo photographs is however known in the art; see U.S. Pat. Nos. 3,432,674 and 3,595,995 to Hobrough, incorporated by reference herein, wherein a video correlator is employed for producing a stream of parallax signals resulting from the simultaneous sequential scanning of left and right stereo photographs. The present invention advantageously utilizes 2-dimensional storage of X parallax error signals as taught by the 3,595,995 patent, which may readily be converted into a map of Z or depth values indicative of the shape of the object under inspection.

Referring now to FIG. 1, a 3-dimensional object under inspection 1, is positioned upon a base that could define datum plane 2, and is viewed by left-hand stereo apparatus comprising camera lens 3 along with an X-Y CCD array 4. Right-hand viewing apparatus, comprising camera lens 6, and X-Y CCD array 7, is also provided as indicated. A first field boundary, or principal camera axis 11, passing through the center point of lens 3, is oriented perpendicular to both datum plane 2 at the edge of the field of view, and the plane of CCD array 4, and in like manner, field boundary or principal camera axis 12, passing through the center point of lens 6, is positioned perpendicular to both datum plane 2 at the opposite edge of the field of view, and the plane of the X-Y CCD array 7. Thus, the active area of each X-Y solid state light detection array is fully offset in an outbound direction with respect to the central portion of the field of view or inspection area, and with respect to the field boundary camera axes 11 and 12. This feature results in the projection of the full object image upon each light detection array, so that a stereo-base distance B (FIG. 1) is provided which is maximized to obtain more accurate measurements.

Light pattern projector 13 is positioned between lenses 3 and 6, and is adjusted so that a smoothly varying pattern is focused upon the object plane. The pattern has a "grating" structure oriented parallel to the Y axes, extending into the plane of FIG. 1. A sinusoidal intensity pattern is indicated in FIG. 3. The "grating" comprising "bands" of low light intensity portions 16 interleaved with high light intensity "bands" 17 along the X direction, represented by line 18; the resulting "grating" has a periodic, smoothly varying light intensity pattern across the surface of object 1, and in the direction indicated by arrow 18. In contrast, the intensity of the pattern is non-changeable along lines perpendicular to line 18, and extending in the Y direction. The intensity variations of the pattern along line 18 could vary as a single pure sinewave, or could vary as a complex function of a sum of sinewaves. It is an important feature of the present invention however, that the pattern must be periodic, and have a smoothly varying light intensity pattern, whether the pattern be made up of a sum of sinewaves or consist of a single sinewave, the latter being satisfactory if single spatial frequency correlation is employed.

Thus projector 13 produces a "grating" pattern upon surface 1 which varies in brightness along the X axes, to artifically produce surface detail upon an object surface that generally does not have sufficient detail, if it is a surface of a smoothly machined part, to permit correlation of homologous image points. The aforesaid components provide for the simultaneous collection of stereo images containing the projected pattern utilized to support the direct measurement of stereo parallax, thus enabling the direct calculation of relative Z elevations, in an X-Y pattern over the entire surface of the part under inspection. Without the projected pattern, the surface finishes of the part are often too fine to be recorded by a solid state camera system, if sufficient field is being covered to render this type of measurement economically feasible and technically practical. The asymmetrical placement of the CCD arrays 4 and 7, result in a stereo-base distance which is maximized in the interests of measurement accuracy. The aforesaid components are integrated into a rigid structure suspended over the part under inspection. The components are adjusted so that corresponding rows of focal plane CCD sensor sites are made to reside closely along epipolar planes i.e., planes which contain the entrance nodes of the two camera lenses; one such plane 20 is indicated in FIGS. 1 and 2. By adjustment of lens focus, and a vertical adjustment of one camera, all lenses will achieve nominal best focus, while the two camera image scales are made to be substantially equal, to effect satisfactory correlation.

Electronic "shutter" means may be actuated to capture the surface image illuminated as mentioned above, simultaneously upon CCD planes 4 and 7. More specifically, each CCD array is "scanned" simultaneously in a few milliseconds and its pixel values are stored in memory as digital values. FIG. 2 illustrates a side view of the imaging apparatus of FIG. 1.

The analog voltage output produced by each pixel element of each focal plane array is converted to a digital grey-scale value and stored in a random access memory (RAM) in row and column order, equivalent to that of the focal plane array. This ordered storage of grey-shade values is the functional equivalent of the more readily understood photograph. The resulting electronic storage of these stereo images are photogrammetrically reliable for the purpose of feature delineation and height determination, so long as the sensor system has been subjected to the standard photogrammetric calibration processes well known to workers in the art of photogrammetry, which permit the correction of lens distortion and datum plane deformation. It is an important feature of the invention that the stereo images of the projected pattern are acquired simultaneously, so that no relative motion errors are present.

The analog grey-scale values produced by each element of the CCD arrays 4 and 7, are digitized and applied by digital processor units 21 and 22 to the parallax measurement processor 23, via leads 24 and 26. In accordance with the present invention, parallax detection is performed by the comparison of image-to-image phase offsets of the frequency components in the image signal, which arise over short segments along the X scanning lines. The short segments thus represent subareas of the field of view and are designated as "points" in the interests of simplicity. Referring again to FIG. 1, a point 26 upon the surface of object 1 is imaged at both point 27 and corresponding point 28 in the CCD array pair. The distance between point 27 in array 4 and point 31 at the edge of the array at the field boundary axes 11 is labeled $x_1$, whereas the distance between corresponding point 28 in array 7, and point 32 at rigid boundary axes 12, is labeled $x_2$. These X values are thus indicative of positional placement in X, of corresponding homologous points within the stereo images. The sum of $x_1$ and $x_2$ represent the total parallax to be measured. The distance between the point 26 on the object and datum plane 2 is labeled H in FIG. 1. It may be seen that should point 26 be positioned closer to the viewing lenses, the distances $x_1$, $x_2$ would increase, and if positioned further away from the lenses, would decrease.

In accordance with the preferred method of the invention, the array of resulting parallax signals are positioned within a storage array so that their storage positions correspond to the coordinate locations of corresponding points of the image pair, in accordance with the techniques of the aforesaid patent 3,595,995 to Hobrough and are converted to depth data, proportional to H, indicative of the displacement of a substantial number of measured points upon the object surface from the datum plane 2 for example, in order to define the shape of the object surface. Digital processor or converter 36 applies the following algorithm, known in the art, to the parallax signals applied thereto by the parallax detection processor: $Z-H=fB/(x_1+x_2)$. B, Z, and H are the parameters indicated in FIG. 1, whereas f represents the sensor focal length, $x_1$ and $x_2$ are as indicated in FIG. 1 for point 26, and it may be noted that the sum of $x_1$ and $x_2$ represents the total parallax value. Methods of manipulating the output data from the grey-scale digitizers in order to compute the range or depth values for each point in the X-Y array are known in the art, and are thus not setforth in detail in the interest of clarity, brevity and economy. One early electronic system for measuring parallax between homologous points on a pair of stereo photographs, is disclosed in great detail in U.S. Pat. No. 3,646,336 to Gilbert Hobrough. A feedback type of stereo correlator is also disclosed in a (presumably published?) paper entitled "Stereopsis For Robots BY Iterative Stereo Image Matching" by Gilbert and Theodore Hobrough. This paper is also of interest in that it teaches the location of homologous points upon a 3-dimensional object by comparing or correlating associated image patterns. The paper states that the patterns are provided by the natural roughness or tonal irregularity of the surface, and also briefly suggests that a fine-grained random pattern may be projected into the work space. This is in contrast with the periodic, smoothly varying intensity pattern applied to the object under inspection, in accordance with the present invention, producing the beneficial result of enabling edge detection to be simultaneously performed, as discussed previously. The paper is also pertinent since it shows the use of a pair of stereo cameras for directly electronically recording stereo images of an object under inspection, without using photographic film. It also may be noted that a partial offsetting of the imaging plane of the light detection arrays is illustrated, in contrast with the total array offset described above in connection with the present invention. The paper also teaches the production of a parallax signal that is inversely proportional to a depth measurement.

As stated above, and depending upon the number of parallax detection channels to be employed, the variations in light intensity of the projected pattern along the X-direction (18 in FIG. 3) may be equivalent to a single frequency sinusoid or a sum of several sinusoids with phases adjusted suitably to avoid non-smooth edge-like intensity transitions. Assuming the use of a photographically produced pattern slide transparency in light pattern projector 13, its density will range between 0.2 and 0.6, which corresponds approximately to transmissions through the slide between 50-percent and 16-percent. The period lengths of sinusoids in the pattern slide are calculated from the periods desired in the collected images and the relative magnifications of the camera and projector systems. The process of parallax detection may involve the comparison of image-to-image phases of a narrow band of frequency components in the image signals which arise over short segment "points" of the image signals. Because the detection process becomes inefficient beyond 90-degrees offset and goes into sign reversal beyond 180-degrees offset, several frequency bands may be employed if necessary to avoid ambiguity and yet to achieve the maximum in discreteness. For a description of electronic correlation of parallax signals utilizing several frequency bands, see col. 41 et. seq. of U.S. Pat. No. 3,432,674 to Hobrough. The process proceeds from a selected low-frequency band and then transitions successively to higher frequency bands. The parallax measurement process could be based upon the iterative detection of phase offset for discrete areas of the images, the integration of these offset 'estimates' within a location-organized memory and then the feedback modification of incoming image signal phase. When the feedback magnitude matches the real image parallax, then the detection process will produce near-zero output and the process will have reached conclusion. Other well known digital correlation techniques could be used which do not incorporate this particular feedback technique.

It should be understood that the method of the present invention setforth above is merely exemplary, and that the scope of the invention is to be restricted only by reasonable interpretation of the language of the following claims and equivalents thereof.

I claim:

1. Method of performing 3-dimensional measurement of the shape of a surface portion of an object within a field of view comprising the steps of:
   (a) projecting one light pattern upon said surface portion, said pattern having a periodic, smoothly varying light intensity pattern along a first direction across said surface portion;
   (b) electronically producing a pair of stereo images of said surface portion illuminated in accordance with step (a), said images stored as first and second arrays of discrete grey-scale values;
   (c) measuring positional placement of corresponding homologous points in said first and second arrays and producing a third array of accumulated parallax data for a substantial number of pairs of said corresponding points; and
   (d) converting said accumulated parallax data to a fourth array of depth data indicative of displacement of said surface portion from a given datum plane, to define the shape of said object.

2. The method of claim 1 wherein said periodic intensity pattern varies sinusoidally across said surface portion in said first direction.

3. The method of claim 1 wherein step (b) is performed by simultaneously recording said pair of stereo images during a single snapshot interval only, in order to permit measurement of objects which are in motion relative to said field of view.

4. The method of claim 3 wherein said periodic intensity pattern varies sinusoidally across said surface portion in said first direction.

5. The method of claim 1 wherein step (b) is performed by positioning a pair of X-Y light detection array fully offset in an outbound direction with respect to field boundary principal camera axes associated therewith, and wherein said axes are arranged to assume positions perpendicular to said datum plane and the planes of said X-Y light detection arrays.

6. The method of claim 2 wherein step (b) is performed by positioning a pair of X-Y light detection arrays fully offset in an outbound direction with respect to field boundary principal camera axes associated therewith, and wherein said axes are arranged to assume positions perpendicular to said datum plane and the planes of said X-Y light detection arrays.

7. The method of claim 3 wherein step (b) is performed by positioning a pair of X-Y light detection arrays fully offset in an outbound direction with respect to field boundary principal camera axes associated therewith, and wherein said axes are arranged to assume positions perpendicular to said datum plane and the planes of said X-Y light detection arrays.

8. The method of claim 4 wherein step (b) is performed by positioning a pair of X-Y light detection arrays fully offset in an outbound direction with respect to field boundary principal camera axes associated therewith, and wherein said axes are arranged to assume positions perpendicular to said datum plane and the planes of said X-Y light detection arrays.

9. Method of performing 3-dimensional measurement of the shape of a surface portion of an object within a field of view comprising the steps of:
   (a) projecting one light pattern upon said surface portion, said pattern having a periodic, smoothly varying light intensity pattern along a first direction across said surface portion;
   (b) electronically producing a pair of stereo images having grey-scale values proportional to the intensities of said surface portion illuminated in accordance with step (a);
   (c) measuring positional placement of corresponding homologous points in each image and producing an array of accumulated digital parallax data for a substantial number of pairs of said corresponding points;
   (d) storing said parallax data in a storage array at storage positions substantially corresponding to the coordinate locations of corresponding points in one of said stereo images;

(e) converting said accumulated parallax data stored in accordance with step (d) to an array of depth data indicative of displacement of said surface portion from a given datum plane, to define the shape of said object.

10. The method of claim 9 wherein said periodic intensity pattern varies sinusoidally across said surface portion in said first direction.

11. The method of claim 9 wherein step (b) is performed by simultaneously recording said pair of stereo images during a single snapshot interval only, in order to permit measurement of objects which are in motion relative to said field of view.

12. The method of claim 11 wherein said periodic intensity pattern varies sinusoidally across said surface portion in said first direction.

13. The method of claim 9 wherein step (b) is performed by positioning a pair of X-Y light detection arrays fully offset in an outbound direction with respect to field boundary principal camera axes associated therewith, and wherein said axes are arranged to assume positions substantially perpendicular to said datum plane and the planes of said X-Y light detection arrays.

14. The method of claim 10 wherein step (b) is performed by positioning a pair of X-Y light detection arrays fully offset in an outbound direction with respect to field boundary principal camera axes associated therewith, and wherein said axes are arranged to assume positions substantially perpendicular to said datum plane and the planes of said X-Y light detection arrays.

15. The method of claim 11 wherein step (b) is performed by positioning a pair of X-Y light detection arrays fully offset in an outbound direction with respect to field boundary principal camera axes associated therewith, and wherein said axes are arranged to assume positions substantially perpendicular to said datum plane and the planes of said X-Y light detection arrays.

16. The method of claim 12 wherein step (b) is performed by positioning a pair of X-Y light detection arrays fully offset in an outbound direction with respect to field boundary principal camera axes associated therewith, and wherein said axes are arranged to assume positions substantially perpendicular to said datum plane and the planes of said X-Y light detection arrays.

* * * * *